Aug. 1, 1933.    C. C. FARMER    1,920,939
VALVE SEATING DEVICE
Filed May 8, 1931
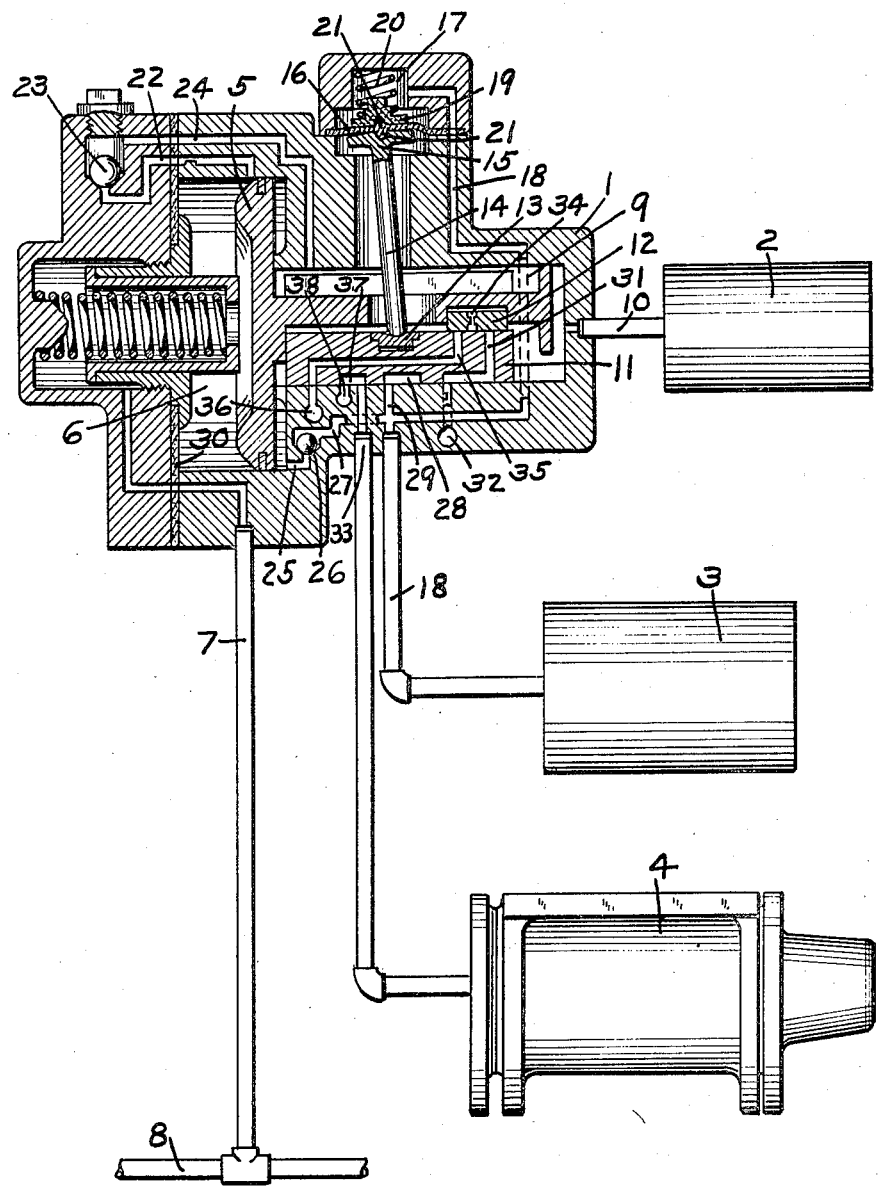
INVENTOR.
CLYDE C. FARMER
BY  Wm. M. Cady
ATTORNEY.

Patented Aug. 1, 1933

1,920,939

UNITED STATES PATENT OFFICE 1,920,939

VALVE SEATING DEVICE

Clyde C. Farmer, Pittsburgh, Pa., assignor to The Westinghouse Air Brake Company, Wilmerding, Pa., a Corporation of Pennsylvania Application May 8, 1931. Serial No. 535,955

13 Claims. (Cl. 303—1)

This invention relates to fluid pressure valve devices and more particularly to a valve device having a slide valve movable on a seat.

It has heretofore been proposed to provide means for holding a slide valve to its seat against fluid pressure tending to lift the slide valve from its seat, when the fluid pressure in the chamber containing the slide valve is at or near atmospheric pressure. However, when the chamber is charged with fluid under pressure, the slide valve is pressed against its seat by the combined pressures of the fluid and said means.

The principal object of my invention is to provide improved means for holding a slide valve seated, said means cooperating with the pressure of fluid in the chamber containing the slide valve in such a manner that the slide valve is normally pressed into engagement with its seat only by the pressure of fluid in said chamber, but when the pressure of fluid in said chamber is reduced, said means operates to exert a seating pressure on the slide valve in accordance with the degree of fluid pressure reduction in said chamber.

Other objects and advantages will appear in the following more detailed description of my invention.

In the accompanying drawing, the single figure is a diagrammatic view, mainly in section, of a fluid pressure brake equipment including a valve device embodying my invention.

In order to illustrate an application of my invention, I have shown the same applied to a valve device of a fluid pressure brake equipment comprising a brake controlling valve device 1, a volume reservoir 2, a reservoir 3 and a brake cylinder 4.

The brake controlling valve device 1 comprises a piston 5 having at one side a chamber 6 connected through passage and pipe 7 to the usual brake pipe 8 and having at the opposite side a valve chamber 9 connected through passage and pipe 10 to the reservoir 2 and containing a main slide valve 11 and an auxiliary slide valve 12 adapted to be operated by said piston.

According to my invention, means are provided for, under certain conditions, exerting a seating pressure on the main slide valve 12, said means comprising a push rod 14 having one end rounded for engagement in a recess of an insert 13 carried by said slide valve. The other end of the push rod 14 is provided with an enlarged or head portion 15 having a slightly arcuate shaped face adapted to engage one side of a flexible diaphragm 16. The diaphragm 16 has at the other side a chamber 17 communicating through passage and pipe 18 with the reservoir 3. Contained in the chamber 17 is a spring seat 19 and a light spring 20 urging said seat into engagement with the diaphragm 16. The diaphragm 16 is provided on each of its two faces with a button-shaped projection 21 engaging in corresponding recesses in the head portion 15 of the push rod 14 and in the spring seat 19, said projections being adapted to prevent shifting of the push rod head 15 and spring seat 19 on the diaphragm 16.

The coil spring 20 is of only a small value and is adapted to exert sufficient pressure through the push rod 14 on the slide valve 11 to hold said slide valve in engagement with its seat when the brake equipment is void of fluid under pressure as occurs, for instance, during shipment of the brake controlling valve device. The pressure of spring 20 is thus not adapted to have any appreciable effect upon the operation of the slide valve 11 and therefore will not be considered in the operation of the brake equipment.

In operation, the brake pipe 8 is supplied with fluid under pressure in the usual manner, and fluid under pressure flows from the brake pipe 8 through pipe and passage 7 to the piston chamber 6. With the piston 5 in the release position, as shown in the drawing, fluid under pressure flows from chamber 6 through passage 22, past the check valve 23 and through passage 24 to valve chamber 9.

Fluid under pressure supplied to valve chamber 9 flows through passage and pipe 10 to the reservoir 2 and also through passage 25, past a ball check valve 26, through passage 27 and pipe 18 to reservoir 3. From passage 27 fluid under pressure also flows through passage 18 to diaphragm chamber 17 of the valve loading device. The diaphragm 16 is thus subject on one side to the pressure of fluid in valve chamber 9 and on the opposite side to the pressure of fluid in chamber 17, which is supplied with fluid under pressure from the valve chamber 9. Since the fluid pressures acting on the opposite sides of the diaphragm 16 are thus equal, said diaphragm is in equilibrium and the slide valve 11 is pressed into engagement with its seat only by the pressure of fluid in valve chamber 9.

The seating of the slide valve 11 is at all times opposed by fluid under pressure from reservoir 3 acting in cavity 28 of said slide valve, said cavity being connected to said reservoir through passage 29 and passage and pipe 18.

When the brake pipe pressure, and the pressure in the piston chamber 6 is vented as in effecting an emergency application of the brakes, the pressure of fluid in valve chamber 9 shifts the piston 5 and slide valves 11 and 12 toward the left until the piston 5 engages a gasket 30. In this position, the slide valve 12 uncovers a port 31 in the slide valve 11, which port registers with an atmospheric passage 32. Fluid under pressure is thus permitted to flow from the valve chamber 9 and the connected reservoir 2 to the atmosphere. At the same time, cavity 28 connects passage 29 to passage 33, which permits fluid under pressure to flow from the reservoir 3 to the brake cylinder 4 and apply the brakes.

When fluid under pressure is vented from the brake pipe and from piston chamber 6, as in effecting an emergency application of the brakes, fluid under pressure is vented from valve chamber 9 through port 31 and atmospheric passage 32, thereby reducing the pressure acting on the valve chamber side of the diaphragm 16. The pressure of fluid in diaphragm chamber 17 reduces with the pressure of fluid in reservoir 3 and may reduce to equalization into the brake cylinder 4. However, this reduced or equalized pressure in diaphragm chamber 17 exerts a force on the diaphragm 16. This force is transmitted through the push rod 14 to the slide valve 11 and is of such an intensity as to hold the slide valve 11 seated against the opposing pressure of fluid from reservoir 3 acting in cavity 28. It will be noted that when the piston 5 and the slide valves 11 and 12 are in their inner position, the diaphragm 16 is ineffective, but when said piston and valves move to their outer position, the slide valve 11 is pressed into engagement with its seat by the pressure differential acting on the diaphragm 16.

When the slide valves 11 and 12 move toward the left upon a reduction in brake pipe pressure, a port 34 registers with port 35 in the main slide valve 11 before port 31 is uncovered by the auxiliary slide valve 12, and port 35 registers with an atmospheric passage 36 in the slide valve seat. If the rate of reduction in brake pipe pressure in piston chamber 6 is less than an emergency rate, as for instance, a service rate, the venting capacity of port 34 reduces the pressure in valve chamber 9 and reservoir 2 at substantially the rate of reduction in brake pipe pressure in piston chamber 6. This reduces the differential on piston 5 and the movement of said piston and the slide valve 11 stops. Then, when the pressure in chamber 9 is reduced to a degree lower than the reduced brake pipe pressure in piston chamber 6, said piston and graduating valve are moved back toward the right, so as to lap the port 35 and thus prevent further reduction in pressure in valve chamber 9.

From the foregoing, it will be noted that when the pressure in piston chamber 6 is reduced at a rate less than an emergency rate, the main slide valve 11 does not move, and the pressure of fluid from reservoir 3 acting in cavity 28 remains constant. As a result, the pressure in diaphragm chamber 17 remains constant. Normally, the opposing pressures acting on the diaphragm 16 are equal, but when the pressure in valve chamber 9 is reduced, a differential is created on the diaphragm 16 equal to the degree of pressure reduction in valve chamber 9, and this differential acting on said diaphragm exerts a force through push rod 14 on the slide valve 11 substantially equal in degree to the degree of reduction in fluid pressure in valve chamber 9 acting on said slide valve. Thus, when the brake pipe pressure is reduced at less than an emergency rate, the slide valve 11 is held seated with a force which remains substantially constant as the pressure in valve chamber 9 is reduced.

When the brake pipe pressure and the pressure in piston chamber 6 is increased after an emergency reduction in brake pipe pressure, the piston 5 and operated parts are moved to their release position against the reduced pressure in valve chamber 9. In the release position, reservoirs 2 and 3 are charged with fluid under pressure supplied from the brake pipe to valve chamber 9, and the brake cylinder 4 is opened to the atmosphere through pipe and passage 33, cavity 37 in the slide valve 11 and an atmospheric passage 38, thereby permitting a release of the brakes.

When the main slide valve 11 is moved on its seat, the rod 14 is rocked, the rocking movement being facilitated by the rounded end of said stem engaging in the recess in the insert 13. The insert 13 is provided for wear instead of permitting the rod 14 to directly engage a recess in the slide valve.

It will be noted that according to my invention, the slide valve 11 is pressed into engagement with its seat, only by the pressure of fluid in valve chamber 9 when the brake controlling valve device is in its inner or release position, but when the pressure in said valve chamber is reduced, the difference between the fluid pressure in said valve chamber and in the diaphragm chamber 17 acting on the diaphragm 16 exerts a seating pressure on the slide valve 11 which is adapted to substantially offset the reduction in fluid pressure in valve chamber 9. Thus the slide valve 11 is at all times held seated against the opposing pressure of fluid in cavity 28 by a pressure which is substantially constant and which under no condition exceeds the normal pressure of fluid in valve chamber 11.

One particular feature of my improved valve seating means is that it is automatically adaptable to various brake pipe pressures, for it will be evident that the fluid pressure normally acting on the opposite sides of the diaphragm 16 will be equal to brake pipe pressure, thus rendering the valve seating diaphragm 16 and push rod 14 normally ineffective. However, upon a reduction in pressure in the valve chamber 9, the diaphragm 16 and push rod 14 will operate in the same manner as hereinbefore described, but will provide a greater seating pressure on the slide valve 11 to offset the higher pressure in cavity 28 resulting from the higher brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure operated valve device, the combination with a slide valve contained in a slide valve chamber normally charged with fluid under pressure, and exposed on its seat side to fluid under pressure, of an abutment subject on one side to the pressure in said valve chamber and on the opposite side to an opposing pressure, and a stem having rocking engagement with said valve and operated by said abutment to exert pressure on said valve.

2. In a fluid pressure operated valve device, the combination with a slide valve contained in a slide valve chamber normally charged with fluid under pressure, and exposed on its seat side to fluid under pressure, of a diaphragm subject to the opposing pressures of said valve chamber and a pressure chamber, and a stem having rocking engagement with said valve and operated by said diaphragm to exert pressure on said valve.

3. In a fluid pressure operated valve device, the combination with a slide valve contained in a slide valve chamber normally charged with fluid under pressure, and exposed on its seat side to fluid under pressure, of an abutment subject on one side to the pressure of a spring, and a stem having rocking engagement with said valve and operated by said spring to exert pressure on said valve.

4. The combination with a brake pipe, a chamber and a reservoir, of a valve device operative upon an increase in brake pipe pressure to supply fluid under pressure from said brake pipe to said chamber and to said reservoir and operative upon a reduction in brake pipe pressure to vent fluid under pressure from said chamber, said valve device comprising a slide valve normally pressed into engagement with its seat by the pressure of fluid in said chamber, and means operated by the difference in pressures in said chamber and reservoir for exerting a seating pressure on said slide valve upon a reduction in pressure in said chamber.

5. The combination with a brake pipe, a chamber and a reservoir, of a valve device operative upon an increase in brake pipe pressure to supply fluid under pressure from said brake pipe to said chamber and to said reservoir and operative upon a reduction in brake pipe pressure to vent fluid under pressure from said chamber, said valve device comprising a slide valve normally pressed into engagement with its seat by the pressure of fluid in said chamber, and means subject to the opposing pressures of said reservoir and chamber and operative upon a reduction in pressure in said chamber to exert a seating pressure on said slide valve.

6. The combination with a brake pipe, a chamber and a reservoir, of a valve device operative upon an increase in brake pipe pressure to supply fluid under pressure from said brake pipe to said chamber and to said reservoir and operative upon a reduction in brake pipe pressure to vent fluid under pressure from said chamber, said valve device comprising a slide valve normally pressed into engagement with its seat by the pressure of fluid in said chamber, and means subject to the opposing pressures of said reservoir and chamber and operative upon a reduction in pressure in said chamber to exert a seating pressure on said slide valve, the degree of said seating pressure varying with the reduction in pressure in said chamber.

7. The combination with a brake pipe, a chamber and a reservoir, of a valve device operative upon an increase in brake pipe pressure to supply fluid under pressure from said brake pipe to said chamber and to said reservoir and operative upon a reduction in brake pipe pressure to vent fluid under pressure from said chamber, said valve device comprising a slide valve normally pressed into engagement with its seat by the pressure of fluid in said chamber, and means operated by the pressure of fluid in said reservoir for exerting a seating pressure on said slide valve, said means being normally rendered ineffective by the pressure of fluid in said chamber.

8. The combination with a brake pipe, a chamber and a reservoir, of a valve device operative upon an increase in brake pipe pressure to supply fluid under pressure from said brake pipe to said chamber and to said reservoir and operative upon a reduction in brake pipe pressure to vent fluid under pressure from said chamber, said valve device comprising a slide valve normally pressed into engagement with its seat by the pressure of fluid in said chamber, an abutment subject to the opposing pressures in said chamber and reservoir, and a push rod interposed between said abutment and said slide valve for transmitting the differential pressure on said abutment to said slide valve upon a reduction in pressure in said chamber.

9. The combination with a brake pipe, a chamber and a reservoir, of a valve device operative upon an increase in brake pipe pressure to supply fluid under pressure from said brake pipe to said chamber and operative upon a reduction in brake pipe pressure to vent fluid under pressure from said chamber, said valve device comprising a slide valve normally pressed into engagement with its seat by the pressure of fluid in said chamber, an abutment subject to the opposing pressures of said reservoir and chamber, and a push rod having rocking engagement with said slide valve and operative by said abutment to exert pressure on said slide valve in accordance with the reduction in pressure in said chamber.

10. A fluid pressure operated valve device comprising a slide valve, a diaphragm subject to fluid pressure and having a button-shaped projection, a push rod engaging said diaphragm and slide valve for transmitting pressure from said diaphragm to said slide valve, and having a recess adapted to receive the projection on said diaphragm.

11. A fluid pressure operated valve device comprising a slide valve, a diaphragm subject to fluid pressure and having a button-shaped projection, a push rod having rocking engagement with said slide valve, and a recessed arcuate-shaped face for receiving said projection and engaging said diaphragm and operative by said diaphragm to press said slide valve into engagement with its seat.

12. A fluid pressure operated valve device comprising a slide valve, a diaphragm, a spring follower disposed on one side of said diaphragm, a spring exerting pressure on said follower, a push rod having rocking engagement with said slide valve and having a head portion engaging the other side of said diaphragm for transmitting the pressure of said spring to said slide valve to hold said slide valve in engagement with its seat, and a projection on each side of said diaphragm received by a corresponding recess in the respective follower and push rod head portion for preventing lateral movement of said follower and head portion relative to said diaphragm.

13. The combination in a casing having a chamber containing a slide valve subject on its seating face to fluid under pressure, of a piston having a stem for moving said slide valve, a pin loosely extending through an aperture in said piston stem and engaging said slide valve, and means acting on said pin for exerting a seating pressure on said slide valve.

CLYDE C. FARMER.